Figure 1:
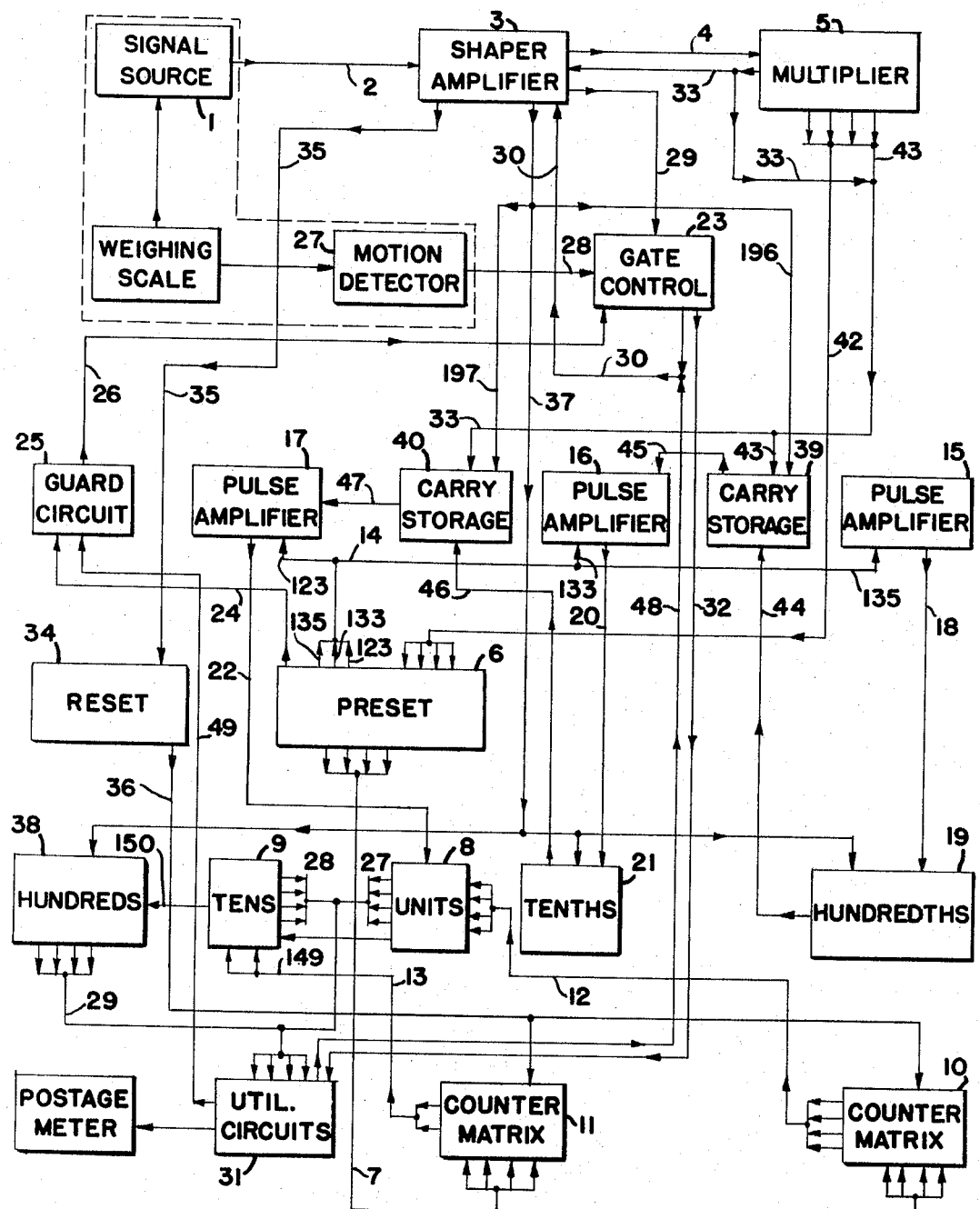

INVENTORS
ROBERT E. BELL
ROGER B. WILLIAMS JR.
BY
ATTORNEYS

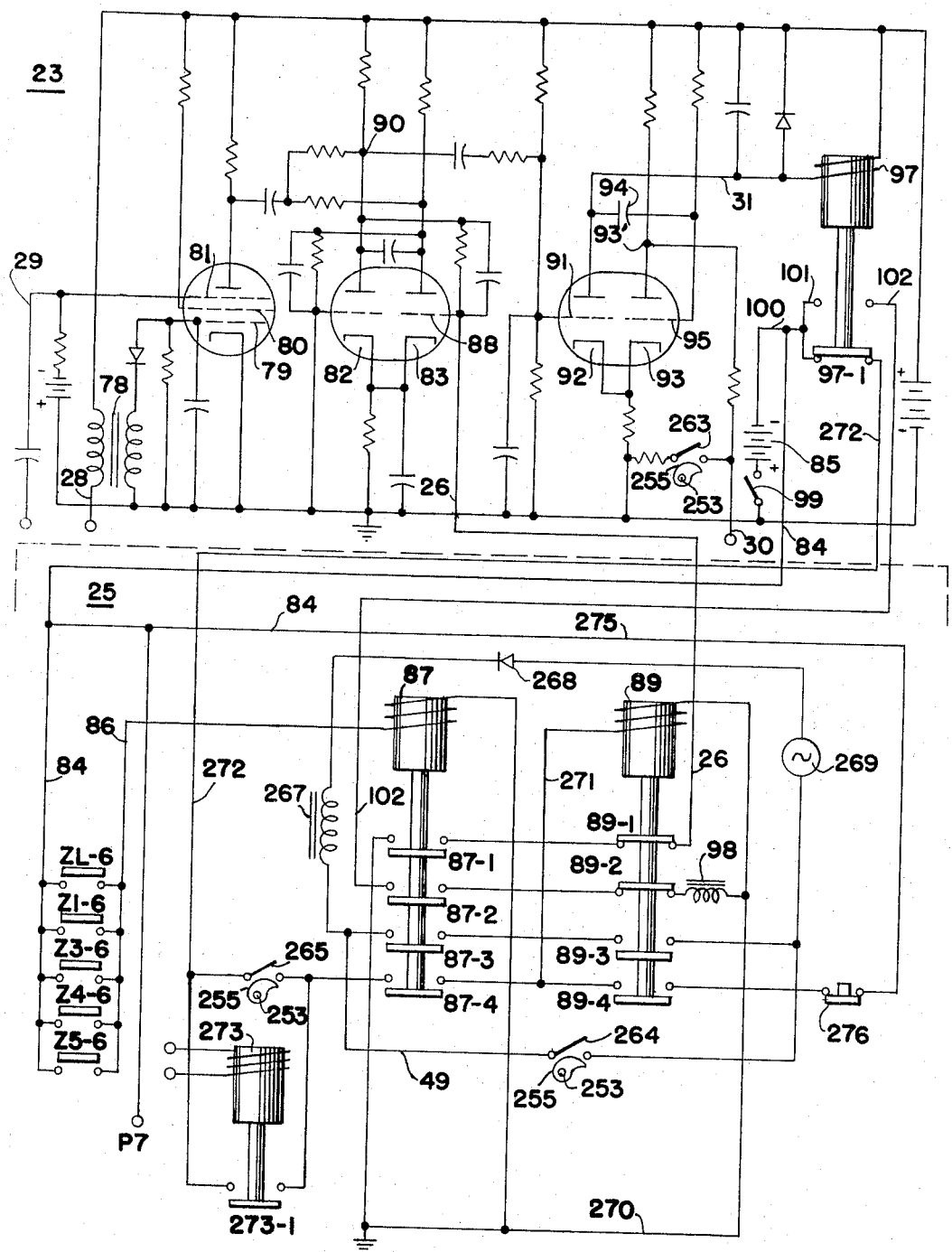
Fig. II
INVENTORS
ROBERT E. BELL
ROGER B. WILLIAMS JR.
BY Marshall, Wilson, Click & Keating
ATTORNEYS

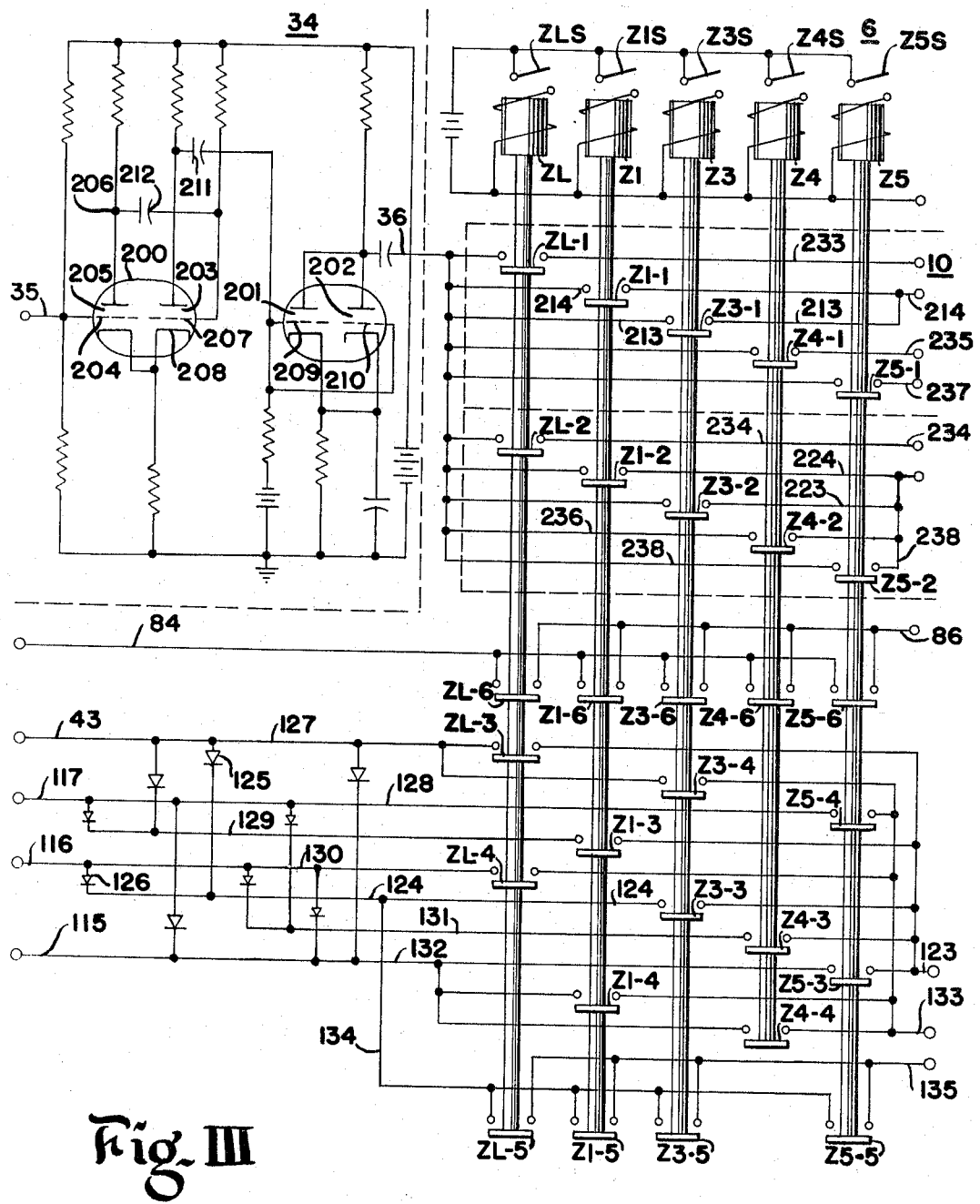
Fig. III
INVENTORS
ROBERT E. BELL
ROGER B. WILLIAMS JR.
BY
ATTORNEYS

April 18, 1967 R. E. BELL ETAL 3,315,067
GUARD MEANS TO AVOID FALSE COMPUTATIONS
FOR LOAD MEASURING APPARATUS
Filed June 11, 1962 4 Sheets-Sheet 4
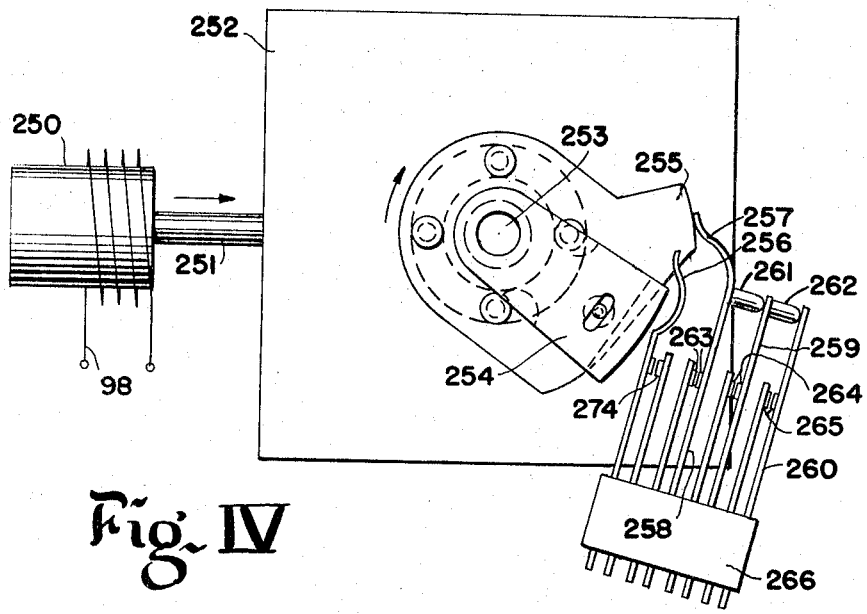
Fig. IV
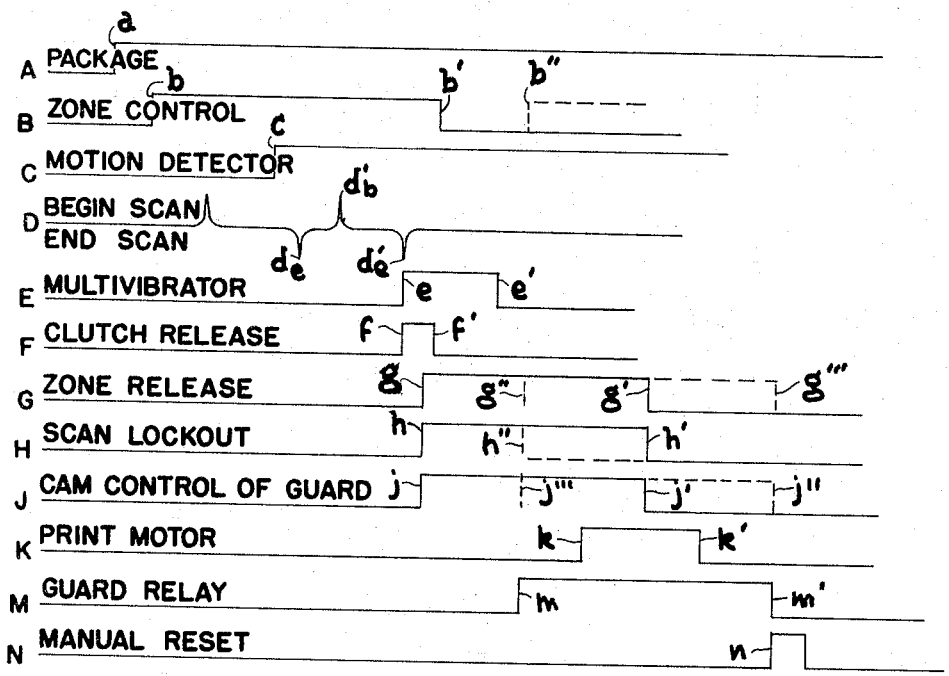
Fig. V
INVENTORS
ROBERT E. BELL
BY ROGER B. WILLIAMS JR.
ATTORNEYS

United States Patent Office 3,315,067
Patented Apr. 18, 1967

3,315,067
GUARD MEANS TO AVOID FALSE COMPUTATIONS FOR LOAD MEASURING APPARATUS
Robert E. Bell and Roger B. Williams, Jr., Toledo, Ohio, assignors to Toledo Scale Corporation, Toledo, Ohio, a corporation of Ohio
Filed June 11, 1962, Ser. No. 201,692
16 Claims. (Cl. 235—151.33)

This invention relates to computing devices and more particularly to computing devices integrated with condition responsive means such as weighing scales and with utilization means such as indicators, tabulation means, printing devices and the like wherein a computing factor is combined with the response from the condition responsive element to actuate a device providing a useful output.

This is a continuation-in-part of application Serial No. 657,947 filed May 8, 1957, for "Load Measuring Apparatus," now Patent No. 3,039,686, which is directed particularly to means for guarding against false operations of a computing system employing information from a condition responsive device and information which is selectively supplied for each computing cycle. The system with which this invention is illustrated is a computing weighing scale controlling a postal meter wherein application of a parcel to the scale load receiver generates an electrical signal employed in conjunction with a factor selected by a postal zone control to compute a postage value applicable to the parcel for a destination in the selected postal zone. Such computations are then read out to a postage meter which prints a postage label for the package. Computation is effected rapidly in the sysem; however, some time is consumed in mechanically transposing the computer signal to a postage meter setting and in printing the label. Each operating cycle of the system requires the selection of a zone in the order to assure that the operator conscientiously considers the zone of the parcel destination.

Zone selection is released in the present system shortly after the readout or decoding function is initiated. Thereafter it is possible to select the zone for the next parcel. If such selection is made during the readout operation for a preceding parcel computation confusion may arise as to the parcel to which a label is to be applied and a second computation may be made for the same parcel. Further, if the zone release was ineffective as in the case of a faulty release operation or the holding of the zone selection beyond the release operation a guard function is required to insure against improper issuance of postage labels. According to the present invention a guard means is provided which prevents a subsequent operation of the system if a new zone selection is made prematurely. Such guard action can be in the form of a lockout of the computation signals as by preventing the issuance of a weight signal to the computer, the lockout of the readout mechanism, and the maintenance of the release condition for the zone selection release mechanism. When the guard means is operated it can be reset, but advantageously such reset requires an extraordinary act on the part of the personnel operating the system to call their attention to the misuse. A manual reset is illustrated.

One object of this invention is to improve computing weighing scales.

A second object is to avoid false computations in a computing device having input information fed from a condition responsive device.

A third object is to avoid misapplying computations for a particular utilization cycle in a computing system having a preconditioning means which is operated prior to computation.

Another object is to insure that the combined signal source, computer and utilization means are all conditioned appropriately prior to the initiation of their operation.

In realizing the above objects a condition responsive device has been combined with computer and a utilization device. The computer has been arranged to respond to the signals from the condition responsive device only under certain conditions in order to avoid false or undesired operation and to generally sense the existence of those conditions automatically. Only a minimum of effort or thought on the part of operating personnel is required to operate the system by virtue of the simplified control means employed, yet incorrect operation is virtually impossible due to the inclusion of guard means. Further the system is arranged for rapid operation such that the actuation of the condition responsive element can be terminated prior to the completion of the system's functions, in particular prior to the operation of the utilization means.

A system for computing the postage rates for items to be sent by parcel post and for controlling a postage meter to cause it to print a label of the computed value will be described as an illustration of a specific embodiment of the invention. Such a system will include a weighing scale of convenient form such as a counter top type arranged to drive a signal translator feeding a computer. Controls for the computer enable computing factors and constants to be established therein so that they will be operated upon by appropriate input signals to generate an output. A decoder can couple this output to a utilization means or it can be fed directly to such means.

In the illustrative embodiment a translator of electrical signals having a form which is a function of the weight of the object applied to the weighing scale is employed to feed an electronic computer. In particular, the electrical signal is a series of pulses, the number of pulses corresponding to the weight of the object. The resulting pulses are fed to computer and control devices. In the computer, the pulses are multiplied by a chosen factor, the postal rate per pound in excess of the first pound for parcel post applications, and are accumulated with a correlated constant in electronic counters. Since the minimum charge for the first unit of weight is distinct from the multiplying factor, as is the rate for the first pound in parcel post computations, means are provided to insert that amount into the counters when it is indicated that the item being weighed has attained the minimum weight for the class of service provided. The multiplying factor and the minimum charge are fixed with respect to each other but may vary depending upon the nature of the item, e.g., the class of goods or in parcel post applications the destination of the parcel; accordingly, they can be set up in the computer simultaneously by operation of a single selector.

The computed value is stored in the counters until utilized through means of suitable coupling amplifiers to drive a group of electromechanical decoders which translate binary code to a decimal system which is represented by the position of certain members. These members, three in number in the example, establish the position of postage setting levers for cents, dimes and dollars in a commercial postage meter and then actuate the meter to print a metered label.

Both the multiplying factors and the initial state in the counters are established electrically thereby affording a high degree of flexibility to the computing system so that one or more of these values can be readily altered as where a postage rate is changed. Further, the electronic computation and electromechanical actuation of the postage meter are sufficiently rapid so that the entire automatic operation is accomplished in a small portion of the time required for the scale to accomplish the weighing. Therefore, the speed of the overall operation is essentially that of the weighing and the system saves much shipping personnel time.

The combination is also provided with means for detecting the instant the scale has reached equilibrium or has come sufficiently close to equilibrium to enable an accurate weight determination to be made therefrom. When this level of motion is reached, a signal, in practice the termination of pulses, is passed to a coincidence gate which also requires that the computer has been properly conditioned by operation of a postal zone selection to set up the multiplying factor and the initial counter values and that a complete readout cycle from the scale has been defined, the readout is repetitively operated, to initiate operation of the decoder and postal meter, and to bar further input signals to the multiplier and counter. This lockout prevents false operation of the combination resulting from either a premature readout, an inadvertent second zone selection, or spurious signals.

Upon operation of the gate responsive to the end of a train of pulses a timer is actuated which initiates a utilization cycle by rendering a clutch effective to drive a cam shaft. During a portion of the shaft rotation a cam closes a contact to energize a release solenoid for the zone selection switches, closes a contact to lock out signals from the scale to the computer, and closes a contact to enable operation of a guard relay if certain conditions are sensed. The guard relay is energized only if a second zone selection is registered prematurely or a zone selection is retained beyond the zone reset operation, that is after the initial selection has been or should have been released and while the cam controlled contact is closed or a printing operation is being performed to complete the utilization cycle. Upon release of the initial zone selection and the completion of decoding of the calculated value to a form which can be employed to set the utilization means, a postage meter in the example, a print motor in the postage meter is operated.

While the print motor is effective an alternate circuit around the cam controlled contact for enabling the guard circuit is effective. If a zone selection exists while the guard circuit is enabled, a guard circuit is activated and establishes a holding means which can be released only by some extraordinary act which calls attention to the malfunction. This activated guard circuit cancels the computation in the system by enabling additional pulse trains to be passed to the computer, cancels the operating cycle of the mechanical decoder by discontinuing the operation of a clutch in the decoder drive, and maintains or reactivates the zone release means.

A feature of this invention comprises interlocking the factor selection and/or the constant selection with the operation of the combination to prevent faulty operation.

Another feature comprises interlocking computer input information, information source condition, and the initial conditioning of the computer with its release of computed values and the operation of utilization means coupled to its output.

The above and additional objects and features of this invention will be appreciated from the following detailed description when read with reference to the accompanying drawings wherein:

FIG. I is a block diagram illustrating functionally one cooperative assemblage embodying this invention;

FIG. II is a schematic circuit diagram of further control means for the illustrative combination;

FIG. III is a schematic diagram of one form of computation factor and constant selector according to this invention;

FIG. IV is a portion of one form of utilization means which functions to establish desired operating sequences and to provide an interlock feature to guard against malfunctions in the system of this invention; and FIG. V is a sequence diagram showing the relative instants of operation of certain elements of the invention.

The exemplary system is arranged for simple and rapid operation which ordinarily requires only that the parcel to be mailed be placed upon a load receiver and the postal zone of its destination be signaled to the computer. When the movable system of the weighing scale reaches a position or condition from which an accurate determination of weight can be had as determined by a sensing means such as a motion detector where static weighing is to be accomplished, the system will compute the postage and print a label if the load is within the limits of the system and the zone selection has been made. The completion of these functions is indicated by a zone set indicator which is actuated as the zone is selected and deactuated as the computation is effected. Upon deactivation of the indicator, the package can be removed from the scale even though the operation of the system is incomplete. At the end of the computing and utilization cycle the system is automatically cleared in preparation for the next cycle.

In order to guard against false operation as by a second zone selection operation in a single cycle, the zone selection is enabled but once and for but a limited interval. A second selection or continuation of the first selection beyond a given interval actuates a guard circuit which prevents the operation of the postage meter and disables the computer until it is manually reset, as by the operation of a reset control.

The several functions of the system are performed by subcombination most of which are disclosed in application Ser. No. 657,947, now Patent No. 3,039,686. These subcombinations include a weighing scale which drives a pulse generator (not shown) to generate repetitively trains of pulses, the number in each train corresponding to the weight of the parcel on the scale (not shown). These pulses are fed to a pulse shaper and amplifier (not shown) which includes means to sense the first pulse of each train and the end of the train. This shaper-amplifier also feeds a pulse generator or multiplier (not shown) which produces ten pulses for each pulse it is fed.

An end-of-scan pulse from the shaper-amplifier is sent to a control circuit which includes a pair of coincidence gates, the first requiring a signal from a motion detector signifying that the movable system of the scale has come to rest and a signal indicating that a zone selection has been made. The second gate functions if the first has operated and the end-of-scan pulse is received to cock the control circuit. The next succeeding end-of-scan pulse fires the control circuit to energize the utilization means, an electromechanical decoder, which sets the postage meter at the computed value and then causes it to print a label of that value.

Between successive end-of-scan pulses, the computer has been fed one complete pulse train and has computed the appropriate postage therefrom. These functions have been performed by feeding the pulses from the shaper-amplifier to the multiplier. Nine pulses are available in a factor establishing matrix so that from zero to nine pulses for each pulse of the train can be supplied therefrom to counters corresponding to the order of each digit in a selected computation factor. The trailing edge of the ninth pulse from the multiplier triggers a carry-storage stage between the hundredths and tenths counters if the accumulated pulses in the hundredths counter exceed nine while the trailing edge of the tenth pulse triggers a carry storage stage between the tenths and units counters when the accumulated count in the tenths counter exceeds nine. As the count builds up in the units counter to nine the next count recycles it to zero and transmits a count to the tens counter. The tens counter feeds the hundreds counter when it is fed its tenth pulse.

Since a minimum rate must be applied for the first eight ounces to a pound and the product of the multiplying factor and any fraction of a pound exceeding the first pound added thereto, both the minimum and the factor are established simultaneously. Zone selection means in the form of a manual control, a pushbutton, energizes a relay corresponding to the zone to establish the appropriate multiplying factor, and set the counters at the minimum for that zone in addition to conditioning the gate of the control circuit. Thus, if the minimum weight is applied, the decoder is actuated by the minimum rate plus the product of the multiplying factor and any excess weight. If the weight fails to attain the minimum, however, the decoder does not function and no label is printed.

In the drawings, FIG. I shows a signal source 1 which is actuated by a weighing scale to provide a signal or readout which is of a form characteristic of a displacement in a movable system in the scale. One such scale and readout mechanism is shown in United States Patent 2,938,126, which issued May 24, 1960, to Clarence E. Adler and is entitled "Indicator Scanning Device," wherein the displacement due to an applied load unmasks a portion of a stationary, opaque chart bearing a series of translucent lines, the number of lines exposed being proportional to that load. An optical scanner scans the chart to project a burst of light on a photoelectric cell for each unmasked translucent line scanned. The pulse train resulting from the translation of displacement to light bursts and then to electrical pulses is fed from an amplifier over line 2 to a shaper-amplifier 3 which functions to translate the pulses to a form more acceptable to the following sections of the system and, when properly conditioned, to pass those pulses over line 4 to a multiplier 5. The prerequisites to transmission of the pulses to the multiplier 5 include the setting of the postal zone of the package designation, the reduction of motion in the moving system of the scale to a level permitting accurate readout by the scanner, and the definition of the bounds of a complete scanner generated pulse train. These conditions are sensed in gate control 23.

Zone selection is accomplished in a preset section 6, conveniently by operation of a single normally open contact (not shown) for a given postal zone which energizes a corresponding zone relay (not shown), to select a minimum postal rate for the first pound and feed that information over cable 7 to cents and dimes counters 8 and 9 through presetting matrixes 10 and 11 connected to the respective counters by cables 12 and 13. Preset section 6 also sets up a multiplying factor for each pound or fraction thereof in excess of the first pound so that a number of pulses corresponding to that factor are transmitted over cable 14 to pulse amplifiers 15, 16, and 17 and from thence over lead 18 to counter 19, lead 20 to counter 21 and lead 22 to counter 8 respectively.

Operation of a zone selector is indicated to control circuit 23 by means of lead 24 to guard circuit 25 and thence lead 26. Reduction of motion in the scale is sensed by motion detector 27 and fed to control circuit 23 over lead 28. Scan definition is accomplished in shaper 3 by means which signal the beginning and end of each pulse train resulting from a scan. End-of-scan signals are sent to the control 23 over lead 29. When motion has ceased, a zone has been selected, and two successive end-of-scan pulses (having one complete scan pulse train between them) have conditioned the control 23, it cuts off the transmission of further pulses from the shaper 3 to the multiplier 5 by application of a signal over lead 30 and initiates operation of utilization circuits 31, postage meter controls in the present example, by transmission of a signal over lead 32.

Since the multiplier 5 functions whenever it receives a pulse, it is desirable to reset the counters to their initial value either at the beginning or end of each multiplication. The system generates two resetting signals for this purpose. These signals are generated at the beginning of each multiplication by the multiplier 5 and are fed back to the shaper 3 over lead 33 if the package is of at least the minimum weight, eight ounces for parcel post. One reset signal in the form of a begin-scan pulse is transmitted from shaper-amplifier 3 to reset chassis 34 over lead 35, and from thence to counter matrixes 10 and 11 over lead 36. The other reset pulse emanates from shaper 3 over lead 37 leading directly to the hundreds or dollars counter 38, tenths or mils counter 21, hundredths counter 19, and carry-storage stages 39 and 40. Thus, at the beginning of each scan all signals previously stored in the computer are reset to their minimum values.

Multiplier 5 generates a fixed number of pulses for each pulse transmitted to it from the shaper. Advantageously ten pulses can be generated, the first nine being fed into the preset by cable 42 where the multiplying factor mechanism passes the appropriate number of pulses to the pulse amplifiers 15, 16 and 17 over cable 14. The trailing edges of the ninth and tenth pulses from multiplier 5 are passed by leads 43 and 33 respectively to carry storage stages 39 and 40 respectively. Thus, upon reaching their capacity, nine counts, the lower order counters recycle in response to further pulses and in doing so condition the carry storage stage with which they are associated for operation by the carry pulse. Counter 19 fills upon receiving nine pulses so that the tenth pulse resets it to zero and trips carry storage stage 39 to its abnormal condition by means of a signal over lead 44. The trailing edge of the next ninth pulse from the multiplier returns stage 39 to its normal state transmitting an extra or carry pulse on lead 45 to amplifier 16 and thence over lead 20 to the counter 21 of the next higher order. Similarly the trailing edge of the tenth pulse will return carry storage stage 40 from an abnormal condition created by a pulse on lead 46 to carry a pulse by way of lead 47 to amplifier 17, lead 22, and counter 8. This mode of carry storage prevents the coincidence of a carry pulse and a multiplier pulse in a counter. Carry storage is not necessary for counters 9 and 38 inasmuch as pulses are not fed from the multiplier, but rather, are derived from but one source, the next preceding counter stage, so that there is no possibility that pulses might arrive simultaneously from different sources.

When the computation for a scan is completed, the utilization circuits 31 are actuated by the second end-of-scan pulse which is effective on control 23. In addition to setting the postage meter these circuits also assume the lockout control of the shaper 3 initiated by control 23 by imposing a signal on lead 48 and lead 30 to prevent the transmission of additional pulse trains to the multiplier. Once the computation has been established in the computer and readout has been initiated the zone selection is released by a mechanically actuated circuit. This has no effect on the current utilization cycle and is effective to prepare the system for the next cycle. However, in order to avoid the recycling of the system by an inadvertent zone selection at a time when the current load remains quisecent on the scale a guard circuit is provided. This circuit remains inactive under normal operation and is actuated through operation of a zone selector during the setting of the postage meter and its printing cycle.

Turning now to the details of the exemplary embodiment to which this invention has been applied, it is to be appreciated that detailed disclosures of various portions of the overall combination are presented in issued patents and copending applications. Scale structures embodying suitable translators for electrical readout of the load magnitude are shown in the aforementioned Clarence E. Adler United States patent 2,938,126 entitled "Indicator Scanning Device" and Robert E. Bell and Roger B. Williams, Jr., application Serial No. 592,932 filed June 21, 1956, entitled "Industrial Computing Scale," now Patent No. 3,055,585. The Bell and Williams application Serial No. 592,932 also shows the general configuration of the computer elements including shaper 3, multiplier or pulse generator 5, a means of setting multiplying factors corresponding in some respects to preset 6, pulse amplifiers 15, 16 and 17, carry storage stages 39 and 40, counters 19, 21, 8, 9 and 38 and a somewhat similar control 23 and reset means 34 all combined with a scale. A motion detector 27 for a scale and its cooperation with a control 23 and portions of a shaper 3 is shown in Robert E. Bell and Roger B. Williams, Jr., application Serial No. 657,826 entitled "Condition Responsive Device" filed May 8, 1957, now Patent No. 3,042,128. The solenoid actuated selector mechanism of the utilization circuits 31 for controlling the postage meter is disclosed in the application entitled "Decoder," Serial No. 657,817 filed May 8, 1957, for Clarence E. Adler and Donivan L. Hall.

In view of these supplementing disclosures which are incorporated herein by reference, these elements of the combination will be set forth but briefly with the objective of disclosing only so much of the detail as is essential to an understanding of their cooperative relationship with the inventive features.

As described in application Serial No. 657,947 the trailing edge of the last pulse of the pulse train generated by photoelectrically scanning the displacement of the moving system of a weighing scale actuates an end-of-scan signal in shaper 3 which is transmitted over lead 29 to gate control 23 of FIG. II as a positive going signal issued shortly after the termination of the last pulse from the scanning operation. This signal is used in the control 23 in conjunction with others to provide coincidence gating of the signals controlling the utilization circuits and the transmission of signals to the multiplier 5.

As disclosed in detail in the above noted Bell and Williams, Jr., application for "Condition Responsive Device," Ser. No. 657,826, premature response by the utilization circuits while the movable system of the scale is in motion is prevented by a motion detector. One suitable form of detector placing no restraining forces on the movable system translates motion into bursts of light. A translucent chart is supported from the movable system of the scale so that it extends into a projecting system which advantageously projects a visual indication of the load on the scale. The projecting system can comprise a projection lamp and a condensing lens on the back side of the movable chart, and, on the front side, a projection lens, a display surface for the projected image and a photocell positioned to receive a portion of that image. The photoelectric cell is irradiated with light bursts by a portion of the projected image which is not intended for display. This image can be formed by opaque lines generally normal to the displacement direction and located on the chart next to those opaque indicia intended for visual readout. When the scale movable system moves, a series of light and dark lines move across the photocell, causing it to generate pulses which are amplified by a motion detector preamplifier (not shown) and transmitted to a control circuit 23 over lead 28. Absence of these pulses conditions a gate in the control circuit 23 to pass signal pulses.

The control circuit is shown in FIG. II. Pulses on lead 28 are coupled by isolation transformer 78 to an integrating circuit which has a time constant of sufficient length to drive the control grid 79 of pentode 80 negative and maintain it at or below cut off between successive pulses of a series from the motion detector while it is moving to any appreciable extent. When these pulses cease, the grid potential rises enabling the tube to pass current when the suppressor grid 81 is driven sufficiently positive. An end-of-scan pulse from shaper 3 provides this trigger impulse over lead 29. The resulting negative going pulse from pentode gate 80 shifts the flip-flop including triodes 82 and 83, if it has been activated, from its normal condition with triode 82 cut off and triode 83 conducting to the abnormal condition with triode 82 conducting and triode 83 cut off. Activation of the flip-flop is accomplished by operating a zone selection switch ZLS, Z1S, Z3S, Z4S or Z5S, as shown in FIG. III whereby the appropriate zone selection relay ZL, Z1, Z3, Z4 or Z5 is energized and a contact ZL–6, Z1–6, Z3–6, Z4–6 or Z5–6 associated therewith in the guard circuit 25 is closed to connect lead 84 from power source 85 to lead 86 to energize relay 87. Contact 87–1 is thereby closed to connect grid 88 of triode 83 to ground through normally closed contact 89–1 of relay 89 and lead 26. This places triode 83 in its normal, conductive state with leads 84 and 86 in combination functioning as lead 24 in the block diagram of FIG. I to couple the preset to the guard circuit.

The transfer of the flip-flop to its abnormal state when gate 80 is conducting depresses the potential of point 90 connected to the anode of triode 82 and the grid 88 of triode 83. The next succeeding end-of-scan pulse on lead 29 returns the flip-flop to its normal state thereby imposing a positive going signal at point 90. This signal is passed to grid 91 of triode 92. Triode 92 and triode 93 in combination with their related circuitry comprise a one shot multivibrator wherein the triode 93 is normally conducting and triode 92 is normally nonconducting. The positive signal at grid 91 shifts triode 92 to the conducting state and cuts off triode 93 by the negative going signal on capacitor 94 connected to grid 95. Capacitor 94 is of a magnitude such that it sustains a charge sufficient to hold triode 93 cut off for 150 milliseconds.

While triode 93 is cut off, the potential at point 93′ is raised above its normal level, thereby overcoming the negative bias imposed on the gate in the shaper 3 through the connection by lead 30 between that point and the grid. This negative bias in shaper 3 bars further scanner pulses from the multiplier. Thus, the gating action in the shaper in passing or barring scan pulses to the multiplier 5 is controlled by the lockout action of the multivibrator in the control 23 and, in turn, by the motion in the scale, by the selection of a postal zone and by the transmission of a complete scan train. Plate current from triode 92 of FIG. II also operates relay 97 to initiate the operation of the electromechanical decoder shown in the aforenoted C. E. Adler application as the signal to the multiplier is barred. Energization of this relay shifts contactor 97–1 upward to apply power from source 85 to a clutch release solenoid 98 in the utilization control provided guard relay 89 has not been operated. This solenoid is energized through a circuit including the normally closed, stand-by switch 99, leads 100 and 101, the relay contacts 97–1, lead 102, contact 87–2 of the zone selection relay 87, and normally closed contact 89–2 of guard relay 89. If an improper sequence of operations has occurred guard relay 89 is energized so that the operation of control relay 97 has not effect in energizing the clutch solenoid 98 and a false postage metering operation is avoided. The operation of the guard circuits energizing relay 89 will be discussed below.

During the excursion of the movable system in the scale when a load is first placed upon the load receiver of the scale pulses are transmitted from the motion detector 27 over lead 28 so that the control 23 prevents operation of the utilization means and permits scanned pulses to be passed to the multiplier 5 from shaper 3. When the movable system comes to rest a section of the control 23 passes the next end-of-scan pulse to condition a trigger so that the following end-of-scan will terminate the transmission of pulses to the multiplier and initiate the operation of the utilization means. This last full pulse train is employed in the computer to effect a computation based thereon.

In normal operation the scanner mechanism can be operated continuously and signals therefrom are transmitted through the shaper 3 to the multiplier 5 continuously until a computation is to be fed to the utilization means. The multiplier generates a train of ten successive pulses for each scan pulse fed it over line 4. Pulse generation in the multiplier occurs at a rate relative to the pulse rate from the scanner which enables an appropriate portion of those ten pulses to be transmitted to the counters before the next scan pulse is received.

These pulses are fed to the perset section 6, where, as shown in FIG. III, the selected multiplying factor has establishd the number of pulses to be transmitted to the pulse amplifiers 15, 16 and 17 for each scan pulse. Since each multiplying factor in this combination is fixed, all of their digits can be set up in a single step. Zone selection switches ZLS, Z1S, Z3S, Z4S, Z5S are provided at a convenient location for the scale operator to accomplish the selection. These switches actuate relays ZL, Z1, Z3, Z4 and Z5 which have contacts arranged to establish a three digit multiplier. These relays also are arranged to preset counters in the computer to the appropriate minimum values of postage and to activate a relay in the guard circuit 25. In order to systematically identify the switches, relays, and contacts all elements utilized in the operations relating to a given zone have their first two symbols identical, these symbols being ZL, Z1, Z3, Z4 and Z5 for local, first and second, third, fourth, and fifth zones, respectively. Similarly the third symbol, except in the case of the relays where no third symbol is employed, indicates the function of the element as: S for selection switch; "–1" for the contacts setting up the reset connections establishing the initial value in the centers counter 8, represented as counter matrix 10 in FIG. I; "–2" for the contacts setting up the reset connections establishing the initial value in the dimes counter 9, represented as counter matrix 11 in FIG. I; "–3" for the contacts setting up the hundredths of a cent multiplying factor; "–4" for the contacts setting up the tenths of a cent multiplying factor; "–5" for the contacts setting up the cents multiplying factor; and "–6" for the contacts energizing relay 87 in the guard circuit.

In the assumed case, zone selection switch Z3S for the third zone is closed to energize third zone relay Z3 and close the hundredths, tenths and units factor contacts for the third zone Z3–5, Z3–4 and Z3–3, respectively. The factor for the third zone is 0.0515. Lead 123 in FIG. III feeds pulses to the units pulse amplifier 17. This lead is connected to lead 124 by Z3–3. Lead 124 is connected to the pulse generator 5 by conductors in cable 42 such that a total of five pulses are imposed on it as a result of each scan pulse. Each scan pulse causes one pulse to appear in line 43, two pulses on line 117, four pulses on line 116, and two pulses on line 115. The single pulse from line 43 and the four pulses from line 116 are passed to line 124 by rectifiers 125 and 126, respectively, to form the total of five. Similar combinations or exclusions by the remaining rectifiers shown apply one pulse to lead 127, two to 128, three to 129, four to 130, six to 131 and nine to 132. The tenth of a cent factor, one, is derived from lead 127 by contact Z3–4 which is connected to line 133 in cable 14 feeding pulse amplifier 16, and the hundredths of a cent factor, five, is fed from lead 124 through lead 134, and contact Z3–5 to line 135.

Operation of any other zone selection relay will set up the multiplying factor for that zone as described above.

Appropriate portions of each of the pulse trains from the hundredths, tenths and unit leads in the factor determining matrix 6 are fed to pulse amplifiers 15, 16 and 17, respectively, and thence to the counters as each scan pulse excites the train. These pulses are accumulated and added to those pulses of any preceding multiplier trains for that scan.

The multiplier and counters function with each scan until the utilization control 30 is operated by control 23. Thus, the accumulated compuation of the combination must be reset to its minimum value with each scan. Reset occurs at the beginning of each scan in response to signals derived from leads 35 and 37 of shaper 3. The resetting operation requires a positive pulse from a low impedance source to reset hundredths counter 19 and tenths counter 21 to nine and hundreds counter 38 to zero. In postal computations the computer must be set at ninety-nine hundredths of a cent since any fraction of a cent in excess of an even cent must be added as an extra cent.

Units and tens counters 8 and 9 each must be reset to one of a plurality of possible values which are established by the zone selector means of FIG. III, schematically represented in preset 6 of FIG. I. In addition to setting up the multiplying factor, the operation of zone selection relays ZL, Z1, Z3, Z4 or Z5 also set up the desired initial conditions in these counters. These initial counts are the minimum postage for the first pound in the selected postal zone. The third zone minimum of the example is $0.23 hence cents counter 8 must be set to three and dimes counter 9 to two.

Each begin-scan signal from lead 35 of shaper 3 is fed to the reset circuit 34, shown in detail in FIG. III, to drive a high impedance pulse generator whose first section includes a one shot multivibrator built around a dual triode 200. The multivibrator is triggered by the positive begin-scan signal and generates a relatively long positive pulse which is amplified and inverted in phase in two triode stages 201 and 202 joined in parallel. Normally the right side 203 of tube 200 is conducting. The positive signal on 35 raises grid 204 to initiate conduction in the left side 205 and reduce the potential at 206 connected to grid 207 of the right side 203 while raising the potential of cathode 208 to cut off right side 203. This imposes a positive pulse on the grids 209 and 210 of triodes 201 and 202 through condenser 211. When the charge on timing condenser 212 has leaked off sufficiently, the multivibrator snaps back to its normal condition and the potential of grids 209 and 210 is depressed. Thus, a negative pulse of a desired duration, e.g., a −200 volt pulse of 150 microseconds having a rise time of 10 microseconds is imposed on circuits connected to reset output lead 36.

The negative reset pulse generated at the beginning of each scan is applied to appropriate flip-flop control grids in counters 8 and 9 by circuits established by the zone relays ZL, Z1, Z3, Z4 and Z5. In the example, Z3–1 is closed by energizing relay Z3 to apply the reset pulse to line 213 in FIG. III connected to line 214 and thence to appropriate reset terminals in the counters as to predetermined combinations of the control electrodes in the series of flip-flop circuits utilized in the units or cents counter 8 as shown in detail in application Serial No. 657,947. Since this pulse is negative it sets those sections of the counter in their nonconducting state which when in such a state represent a count of three according to the code employed. Hence, the first cents pulse fed to this counter over its input lead 22 will advance the count to four.

Similarly counter 9 is set at a count of two by closure of contact Z3–2 in line 223 of FIG. III connected to reset line 224.

Corresponding connections are established in matrixes 10 and 11 in FIG. III to set up in counter 8 a local minimum count of eight when first zone relay contact ZL–1 is closed to line 233 and a count of one in counter 9 when ZL–2 connects 36 to line 234. Operation of first zone relay Z1 connects reset output lead 36 to line 214 through contact Z1–1 to establish a three count in counter 8 and connects lead 36 to line 224 by contact Z1–2 to set up a two count in counter 9. The fourth zone relay Z4 closes contact Z4–1 to apply reset pulses to line 235 connected to counter 8 so as to reset to a count of four and contact Z4–2 in line 236 to reset two in counter 9 over lead 224. Zone five relay Z5 sets up counter 8 for a reset of six through contact Z5–1 and lead 237 while contact Z5–2 sets up a count of two on lead 238 to line 224 of counter 9.

A useful output is derived from the counters when certain conditions in the combination are coincident. These conditions are sensed in control 23 and are transmitted to the utilization circuits over lead 32 and to bar the passage of further scan signals through shaper 3 over lead 30. As set forth above these conditions are the end of motion in the scale, the operation of a zone selection switch, and the registration after the first two conditions of two successive end-of-scan signals. When the second end-of-scan signal operates the gate in shaper 3, the counters are set at the value computed from the scan occurring between the two preceding end-of-scan pulses. The values in the counters are translated into mechanical displacement by an electromechanical decoder arranged to drive the cents, dimes and dollars levers of a commercial postage meter.

The decoder employed in this system is disclosed in detail in the above C. E. Adler application. Generally, it comprises three banks each having four movable code sectors and a searching mechanism which can be latched at but one position for any combination of sector positions. The code is arranged to correlate with the setting means on a postage meter. Each bank of the decoder is connected to a counter so that the unit or cents counter 8 actuates the code sectors in a first decoder bank, the tens or dimes counter 9 actuates the code sectors in a second bank and the hundreds or dollars counter 38 actuates the third bank.

Each counter output lead carries an output signal to a driver (not shown) consisting of a triode amplifier arranged to be cut off when no signal is present on its input lead and to be heavily conducting in response to a signal on its input lead. For example, if the count in unit counter 8 were zero no signal would appear on any of its four output terminals and the four driver triodes connected to these terminals would be cut off.

Sector positioning solenoids (not shown) are operated by the driver triodes when they are conducting. These solenoids shift the sectors (not shown) from a first to a second position to establish a latching position in the decoder determined by the combination of shifted and unshifted sectors.

Thus, any output from zero to nine can be developed from counter 8 by energizing combinations of output terminals for counters 8, 9 and 38 and is translated to a coded position for permutation sectors through driver triodes and sector solenoids. Once the sectors have been positioned the search mechanisms (not shown) for the three banks are caused to scan their positions and each latch when indexed properly for the code applied to the individual banks.

Referring again to FIG. II, when relay 97 is actuated by the control gate it actuates clutch release solenoid 98 to drive the search mechanisms of the electromechanical decoder by coupling a continuously rotating shaft (not shown) to drive means for the search mechanisms. This shaft is driven through a single rotation of 360 degrees to index the search mechanisms on the permutation sectors in the decoder. The shaft rotation also actuates switches by means of a pair of cams as shown in FIG. IV.

In FIG. IV clutch release solenoid 98 of FIG. II actuates single rotating clutch 250 to initiate the rotation of shaft 251 through 360° and thereby drive a gear train 252 and in turn shaft 253. The drive for search mechanisms, cams (not shown), are mounted on shaft 253 together with contact actuating cams 254 and 255.

An understanding of an operation of a typical embodiment of the invention is facilitated by reference to the sequence diagram of FIG. V representing the instants of operation of some of the elements in the system. Initially a package is placed upon the load receiver of a weighing device as indicated at line A at instant $a$ and a zone selection is made by manually closing one of the zone selection switch ZLS through Z5S at instant $b$ in line B. Zone selection can be effected at any time and the operation of the system will be barred until it is made, however, it is assumed that the selection is completed before the load receiver comes to rest. When the motion in the system has reached a level permitting an accurate determination of the weight as at $c$ in line C, a signal is passed from motion detector 27 to gate control 23 over lead 28, and gate control 23 is conditioned by the next end-of-scan pulse, those pulses extending below line D, at instant $d_e$ to enable it to initiate a utilization cycle upon the reception of the next end of scan pulse at instant $d_e'$. A complete scan occurring between beginscan pulse $d_b'$ and $d_e'$ is fed to the computer in the interval between $d_e$ and $d_e'$ and is accumulated in the counters after generating a count corresponding to the appropriate zone constant plus the product of the zone multiplying factor and the weight in excess of a pound of the package. Initiation of the utilization cycle bars the transmission of additional scans to the multiplier until the postage meter has been set to produce a label of the appropriate value and the meter print cycle has been initiated. The initial lockout is coincident with the release of the single revolution clutch in the mechanical decoder, both resulting from the operation of the one-shot multivibrator in control circuit 23 which operates for a given interval as represented by $e$–$e'$ of line E. Instant $e$ in essence coincides with instant $d_e'$ as does instant $f$ representing the energization of clutch release solenoid 98 in line F. Shortly after instant $e$, cam 255 of the decoder, which holds contacts 263, 264 and 265 open when no utilization cycle is operating, disengages follower 257 permitting contacts 263, 264 and 265 to close. When cam 255 permits contact 264 to close in FIG. II, the zone release solenoid 267 is energized to reset the depressed zone selection switch of the series ZLS to Z5S. Thereafter a new zone selection can be made. The repetitive scanning operation and the pulse trains which continue to be generated thereby are barred from the multiplier 5 and succeeding elements of the system once the utilization cycle is undertaken by the closing of contact 263 in FIG. II to ground lead 30 and lock out the transmission of pulses from the shaper amplifier 3. In order to avoid upsetting the weighing, computing and label printing cycle by the premature operation of a zone selection switch, and to avoid the retention of the zone selection switch closed beyond the time of operation of zone release solenoid, the guard circuit is enabled by cam 255 closing contact 265 in FIG. II to energize guard relay 89 if zone release relay 87 is energized at that time. As zone release solenoid 267 normally functions it releases the zone selection relay and thereby drops out relay 87 as represented at instant $b'$ deenergizing clutch solenoid 98 at instant $f'$ to open a circuit through contact 87–2 which in the event of operation of guard relay 89 seals in the zone release solenoid 267. Near the end of the single revolution of the clutch coupling shaft 253 to its drive, cam 254 closes contacts 274 to operate the print motor of the postage meter for an interval from $k$ to $k'$ in line K. During this interval, cam 255 again picks up follower 257 to terminate the scan signal lockout, zone release solenoid 267 is energized and the guard circuit is enabled as at instants $h'$, $g'$ and $j'$ by the reopening of contacts 263, 264 and 265, respectively.

In the event the zone selection was reestablished after zone release should have occurred, as by the premature or inadvertent closure of a zone selection switch, the guard circuit would be activated by energizing relay 89. Similarly, this circuit would also be activated if the zone selection were retained as by a faulty reset operation or a manual holding of a zone switch closed beyond the zone reset operation.

Zone release solenoid 267 is retained energized through closed contact 264 through most of the revolution of shaft 253. If the zone selection is reset by operation of solenoid 267 prior to the dropout of relay 97 as determined by the period $e$–$e'$ of operation of the multivibrator, the circuit from source 85 through lead 100 to lead 272, contact 265, contact 87–4, lead 271, coil 89, lead 270 and ground is broken by the drop of relay 87 to open contact 87–4 and relay 89 is not operated. However, operation of relay 87 after the drop of relay 97 will complete the energizing circuit through 87–4 if either contact 265 is closed or the alternative circuit through print motor relay contact 273–1 is completed. Thus the guard circuit is enabled for operation from the instant relay 97 drops, essentially instant e', through the remainder of the cycle of shaft 253 to the opening of contact 265, at instant g', and beyond to the drop of print relay 273 at instant k' so that the occurrence of a zone selection during that interval will cause operation of the guard circuit.

Guard circuit functions are represented in dotted lines in FIG. V. Relay 89 is energized at instant m in line M if at that moment a new zone selection is made as represented at b" to cancel the current computation and decoding cycle by maintaining, until the guard circuit is reset, zone release solenoid 267 energized following the instant shown at g" through the circuit comprising source 269, rectifier 268, solenoid 267 and contacts 87–3 and 89–3 which bypasses cam controlled contact 264. The guard relay 89 opens contact 89–1 to remove ground from grid 88 of triode 83 in the gate control 23 so that the multivibrator operation is terminated, triode 93 becomes conductive reducing the potential at 93' so that the scan lockout signal on lead 30 to shaper 3 is terminated as at instant h". A holding circuit for guard relay 89 is established from instant j''' in line J by closing contact 89–4. The system must then be reconditioned by operation of a reset such as button 276, as at instant n in line N to drop out relay 89 at m' by opening its holding circuit at instant j" whereby the zone release is dropped out at g''' and the clutch can again be released.

Cams 254 and 255 mounted on the shaft adjacent each other are arranged to engage spring finger followers 256 and 257 displaced with respect to each other along the shaft axis in alignment with their respective cams as shown in FIG. IV. A pile up of leaf springs 258 through 260 mounted in a block 266 of insulating material are secured on a base structure (not shown) common to that supporting shaft 253. When shaft 253 is at rest, before the initiation of the cycle of the shaft, cam 255 engages follower 257 on spring 258 to deflect spring 258 and springs 259 and 260 connected thereto by pins 261 and 262 of insulating material. The deflection of springs 258, 259 and 260 opens contacts 263, 264 and 265. Shortly after the rotation of shaft 253 is initiated in a clockwise direction as viewed in FIG. IV, the high portion of cam 255 is moved away from follower 257 permitting the contacts 263, 264 and 265 to close.

Contacts 263, shown in circuit with the multivibrator including triodes 92 and 93 of FIG. II, upon closing, connect lead 30 to shaper 3 to ground, thereby locking out the transfer of pulses from the scanner through the shaper 3 to the multiplier 5. Cam 255 closes this contact about 50 milliseconds after clutch release solenoid 98 is energized by the firing of the multivibrator energized relay 97. Thus, the lockout of signals through the Schmitt trigger by the multivibrator, maintained operative for 150 milliseconds, is overlapped by the lockout of those signals by closure of contacts 263. The alteration of the values in the counters and the settings of the decoder is prevented by this combination from the initiation of the firing of the multivibrator until the shaft 253 driving cam 255 has passed through essentially a full revolution.

Contacts 264 are closed by the rotation of cam 255 to energize zone release solenoid 267 in FIG. II by connecting it through rectifier 268 to alternating current source 269. Zone release solenoid 267 when energized opens the closed zone selection switch ZLS, Z1S, Z3S, Z4S or Z5S in FIG. III as by a mechanical reset (not shown) to deenergize and drop out the zone relay in circuit therewith.

Contacts 265 shown in FIG. II enter into the guard circuit logic by completing a portion of the energizing path for guard relay 89 when they are permitted to close. At the time these contacts close the zone selection relay 87 normally is deenergized opening its contact 87–4 by virtue of the opening the closed one of the zone relay contacts ZL–6 through Z5–6. However, if the zone selection switch has been maintained depressed an excessive interval, beyond the operating period of the multivibrator and the subsequent drop out of relay 97, either by a faulty zone reset operation or by manually maintaining the zone selection switch closed after the zone release solenoid has had an opportunity to function, so that operation of the zone release is ineffective, or if a second zone selection button is closed prior to the completion of decoding as represented by the essentially full rotation of shaft 253 or the drop of print relay 273, the zone selection relay remains energized completing an energizing circuit from ground through lead 270, the actuating coil 89, lead 271, contact 87–4, contacts 265, and lead 272 to contact 97–1. If multivibrator actuated, control relay 97 has dropped out at this time, contact 97–1 is closed to provide a path from lead 272 through lead 100, source 85, and standby switch 99 to ground. This path is available from the drop of relay 97 throughout the utilization cycle up to the time the postage meter printing operation is completed since postage meter print motor relay 273 is energized during the printing to provide a parallel path around cam operated contacts 265 by closing its contacts 273–1. This interval the guard circuit is enabled by the print relay is illustrated on line K of FIG. V from K to K'.

Before proceeding with a detailed consideration of the guard circuit functions, consider the operation of contacts 274 by the cam 254. Near the end of a cycle of rotation of shaft 253 as measured from the point clutch 250 is actuated, the setting of the postage meter has been accomplished by the decoder mechanism, hence, all that remains to be done is the actuation of the printing mechanism in the meter. Cam 254 is arranged to engage follower 256 after the completion of the postage meter setting and close contacts 274 so that the print mechanism in the meter is actuated. During this actuation relay 273 is energized and contacts 273–1 closed. Printing is completed and the motor and relay 273 deenergized immediately preceding the end of the utilization cycle by the disengagement of cam 254 from follower 256 to open contacts 274.

The guard circuit prevents a new computation cycle from starting before the previous selecting and printing cycle has been completed. It functions to energize relay 89 during the interval between the opening of relay 97 and the completion of the selection and printing cycle if a zone relay contact ZL–6 to Z5–6 is closed to open the path through which grid 88 is grounded by opening contacts 89–1, to bar release of the clutch by opening the energizing circuit for clutch release solenoid 98 at contacts 89–2, to maintain the zone release solenoid 267 energized by closing contact 89–3, and to seal itself in by closing contacts 89–4. The seal in circuit for guard relay 89 extends from ground through closed switch 99, source 85, lead 100, lead 84, lead 275, manual reset switch 276, guard relay contacts 89–4, lead 271, actuating coil 89, lead 270 and ground. Once energized, relay 89 must be released by depressing a reset button to open switch 276, thereby insuring that a malfunction is brought to the attention of the operator.

It is to be understood that the disclosed embodiment of this system is to be interpreted only as illustrative of the invention and not in a limiting sense inasmuch as one skilled in the art might readily modify the invention or utilize it in other applications without departing from its spirit or scope.

Having described the invention, we claim:

1. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means for maintaining the selection of said second signal, means to release selection of said second signal upon completion of utilization of said second signal by said computer in the computation of a value, means to utilize a computed value from said computer, and means responsive to an operative state of said selection means in the interval between the operation of said release means and the operation of said computation utilization means to disable said computation utilization means.

2. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer, enabling a computation of a said value, means to utilize a computer value from said computer, and means responsive to an operative state of said selection means in the interval between the completion of computation of a value and the operation of said computation utilization means for disabling said computation utilization means.

3. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means to decode a computation in said computer, and means responsive to an operative state of said selection means during the operation of said decoding means for disabling operation of said decoding means.

4. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means to decode a computer value in said computer, means to utilize a decoded value, and means responsive to an operative state of said selection means in the interval between the initiation of operation of said decoder means and the operation of said utilization means for disabling said decoder.

5. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said second signal to said computer enabling a computation of a said value, means for maintaining the selection of said second signal, means to release selection of said second signal upon completion of utilization of said second signal by said computer in the computation of a value, means to utilize a computed value from said computer, and means responsive to an operative state of said selection means in the interval between the operation of said release means and the operation of said computation utilization means for releasing said selection means.

6. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means to utilize a computed value from said computer, and means responsive to an operative state of said selection means in the interval between the completion of computation of the value by said computer and the operation of said computation utilization means for releasing said selection means.

7. A combination in accordance with claim 6 wherein the means for releasing said selection means is maintained operative and said combination including means for resetting said selection releasing means.

8. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means to utilize a computed value of said computer, and means responsive to an operative state of said selection means in the interval between the completion of computation of a value and the operation of said computation utilization means for disabling said computation utilization means and releasing said selection means.

9. In combination, a computing weighing scale system comprising a weighing scale, computer mechanism utilizing first and second signals in the computation of a value, means to apply a first signal chracteristic of load upon the scale to said computer, means to select from a plurality of signals a second signal and apply said signal to said computer enabling a computation of a said value, means to decode a computed value, means to utilize a decoded value from said computer, and means responsive to an operative state of said selection means in the interval between the completion of computation of a value and the operation of said computation utilization means for disabling said decoder, disabling said utilization means and releasing said selection means.

10. In combination, a computing weighing scale system comprising a weighing scale, a computer mechanism utilizing first and second signals in the computation of a value, means to apply a first signal characteristic of load upon the scale to said computer, means to select from a plurality of signals a second signal and apply said signal to said computer enabling a computation of a said value, means to decode a computed value, means to utilize a decoded value from said computer, and guard means for preventing a false operation of said computer mechanism responssive to an operative state of said selection means in the interval between the completion of computation of a value and the operation of said computation utilization means, said guard means disabling said decoder means, disabling said utilization means, releasing said selection means and maintaining said guard means operative and reset means for said guard means.

11. A computing weighing scale system comprising a weighing scale, means to generate an electrical signal characteristic of the load applied to the scale, means for manually selecting a computing factor, a computer issuing a signal value resulting from a computation utilizing said load characteristic signal and said selected factor, a printing mechanism, means to institute operation of said printing mechanism to print in accordance with said signal value, means for resetting said selecting means subsequent to said computation, and means for disabling the response of said system to loads in response to the operation of said selecting means subsequent to the operation of said resetting means and prior to the completion of the operation of said printing means.

12. A combination as set forth in claim 11 including means for manually resetting said disabled system.

13. In combination, a computing weighing scale system comprising a weighing scale, means to generate an electrical signal characteristic of the load applied to the scale, means for selecting a computing factor, a computer issuing a signal according to a computation of said load signal and the selected factor, means for reading out said computer signal, means for initiating said readout, means responsive to the selection of a computing factor for operating said initiating means, a guard means for canceling the computation, means for releasing the selecting means upon operation of said readout initiating means, and means responsive to the operative state of said selecting means following the operation of said readout initiating means for activating said guard means.

14. In combination an electronic multiplier, means applying a signal to said multiplier, a factor selecting means for said multiplier to enable a computation utilizing a selected factor and an applied signal, a printing mechanism, means to set the printing mechanism according to the value of a completed computation in said multiplier, means to cancel the selection of a factor upon completion of a computation in said multiplier, means to institute the operation of said setting means, means to initiate a printing operation, means to release said setting means subsequent to the initiation of the printing operation, and means responsive to operation of said factor selecting means intermediate the institution and release of said setting means for barring signals to said multiplier.

15. In combination an electronic multiplier, means applying a signal to said multiplier, a factor selecting means for said multiplier to enable a computation utilizing a selected factor and an applied signal, means for maintaining said selected factor, a printing mechanism, means to set the printing mechanism according to the value of a completed computation in said multiplier, means to cancel the selection of a factor upon completion of a computation in said multiplier, means to institute the operation of said setting means, means for releasing said selected factor subsequent to the institution of operation of said setting means, means to initiate a printing operation, means to release said setting means subsequent to the initiation of the printing operation, and means responsive to operation of said factor selecting means intermediate the institution and release of said setting means for maintaining said factor selecting means released.

16. In combination an electronic multiplier, a factor selecting means for said multiplier to enable a computation utilizing a selected factor and an applied signal, a printing mechanism, means to set the printing mechanism according to the value of a completed computation in said multiplier, means to cancel the selection of a factor upon completion of a computation in said multiplier, means to institute the operation of said setting means, means to initiate a printing operation, means to release said setting means subsequent to the initiation of the printing operation, and means responsive to operation of said factor selecting means intermediate the institution and release of said setting means for barring operation of said setting means for subsequent cycles of said combination.

References Cited by the Examiner

UNITED STATES PATENTS

| | | | |
|---|---|---|---|
| 2,165,275 | 7/1939 | Kimball | 177—25 |
| 2,883,651 | 4/1959 | Akerlund | 235—151.3 X |
| 3,018,050 | 1/1962 | Barrell | 235—193 |
| 3,031,142 | 4/1962 | Cohen et al. | 235—193 |
| 3,093,201 | 6/1963 | Forsberg | 177—25 |

MALCOLM A. MORRISON, *Primary Examiner.*

K. W. DOBYNS, M. P. HARTMAN,
*Assistant Examiners.*